(12) United States Patent
Yoshida et al.

(10) Patent No.: US 10,628,804 B2
(45) Date of Patent: Apr. 21, 2020

(54) DEGRADATION ESTIMATION METHOD AND DEGRADATION ESTIMATION APPARATUS

(71) Applicant: Panasonic Intellectual Property Management Co., Ltd., Osaka (JP)

(72) Inventors: Atsushi Yoshida, Osaka (JP); Wei Zhang, Osaka (JP); Yosuke Tajika, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 15/472,410

(22) Filed: Mar. 29, 2017

(65) Prior Publication Data
US 2017/0337525 A1 Nov. 23, 2017

(30) Foreign Application Priority Data

May 20, 2016 (JP) .................................. 2016-101991

(51) Int. Cl.
*G01M 99/00* (2011.01)
*G05B 23/00* (2006.01)
*F25B 49/00* (2006.01)
*G06Q 10/00* (2012.01)

(52) U.S. Cl.
CPC .......... *G06Q 10/20* (2013.01); *G01M 99/005* (2013.01)

(58) Field of Classification Search
CPC . G05B 23/0283; G06Q 10/20; G01M 99/005; F25B 49/02; F25B 49/04

USPC .......................................................... 702/34
See application file for complete search history.

(56) References Cited

U.S. PATENT DOCUMENTS 7,457,785 B1 * 11/2008 Greitzer .................. G01D 1/18
706/12
2015/0295784 A1 10/2015 Kim et al.

FOREIGN PATENT DOCUMENTS

| EP | 3067851 A1 | 9/2016 |
| JP | 7-091783 | 4/1995 |
| JP | 2013-213669 | 10/2013 |
| WO | 2015/068801 A1 | 5/2015 |

OTHER PUBLICATIONS

The Extended European Search Report dated Sep. 14, 2017 for European Patent Application No. 17165190.4.

* cited by examiner

*Primary Examiner* — Leslie J Evanisko
(74) *Attorney, Agent, or Firm* — Greenblum & Bernstein, P.L.C.

(57) ABSTRACT

A degradation estimation method includes: a service record acquiring step acquiring a service record of maintenance of a device; an analysis step analyzing a degradation state of the device from the service record; a determination standard adjustment step adjusting a first determination standard to a second determination standard depending on the analyzed degradation state, the first determination standard being determined in advance for estimating whether there is degradation of the device or not; a device data acquisition step acquiring first device data indicating state of the device; and a first degradation estimation step estimating whether there is degradation of the device or not using the acquired first device data and the second determination standard.

15 Claims, 17 Drawing Sheets

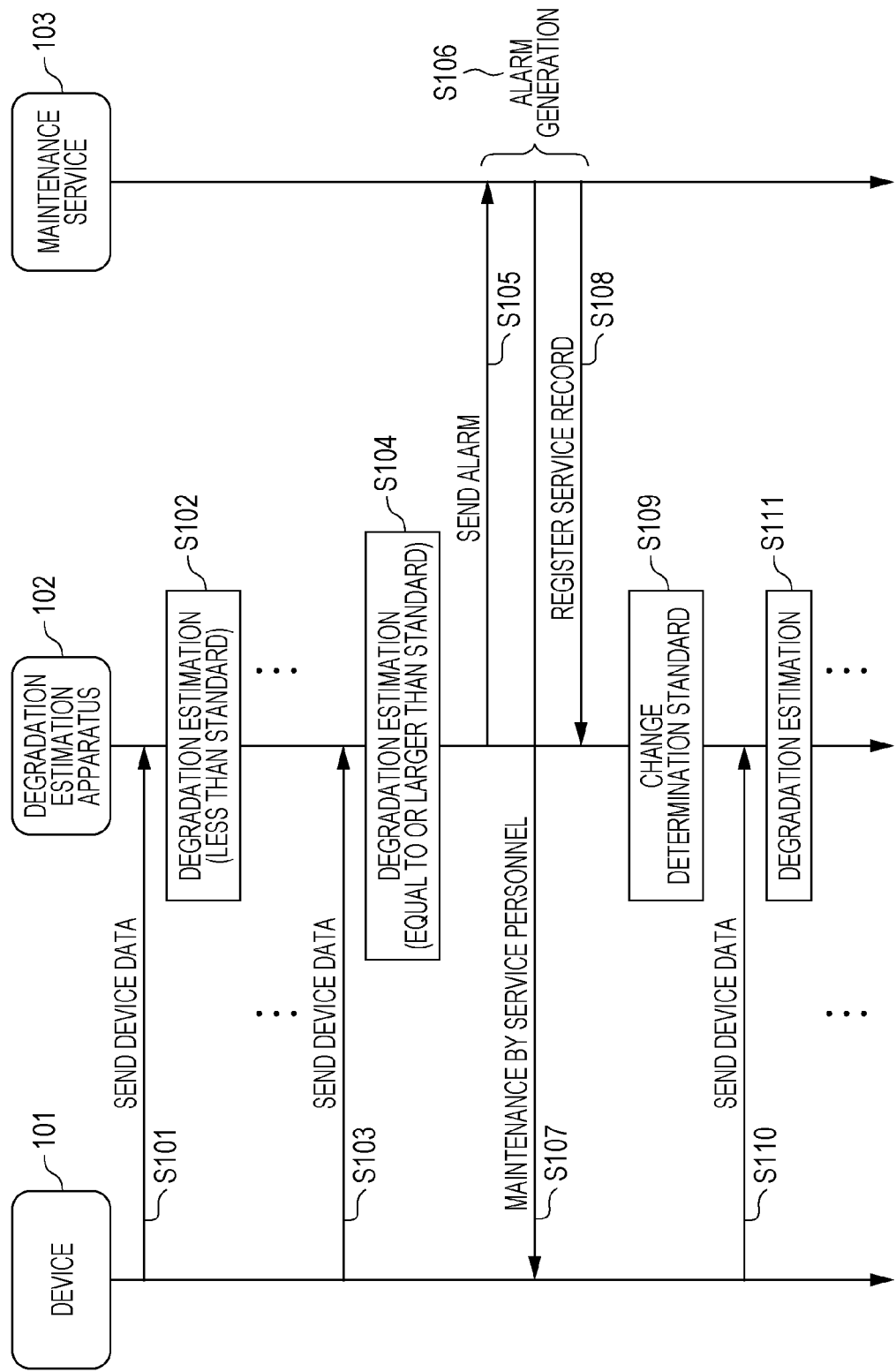

| TIME INFORMATION | DETECTION DATA | | | | | |
|---|---|---|---|---|---|---|
| DETECTION DATE AND TIME | HOT/COLD WATER INLET TEMPERATURE | HOT/COLD WATER OUTLET TEMPERATURE | CONDENSATION TEMPERATURE | COOLANT INTERMEDIATE TEMPERATURE | COOLANT OUTLET TEMPERATURE | COOLANT FLOW RATE RATIO |
| 2015/06/05 12:00 | 11.7 | 7.8 | 34.4 | 32.2 | 33.2 | 99.8 |
| 2015/06/05 13:00 | 11.7 | 7.8 | 34.4 | 32.2 | 33.2 | 99.8 |
| 2015/06/05 14:00 | 21.4 | 22.1 | 25.9 | 28.3 | 26.1 | 9.4 |
| 2015/06/05 15:00 | 11.4 | 8.2 | 34.1 | 32.1 | 33.3 | 99.6 |
| 2015/06/05 16:00 | 9.2 | 8.7 | 27.9 | 26.1 | 26.7 | 100.5 |
| 2015/06/05 17:00 | 11.6 | 7.6 | 33 | 30.5 | 31.7 | 99.3 |
| 2015/06/05 18:00 | 12.1 | 7.8 | 33.8 | 31.1 | 32.4 | 99.1 |
| 2015/06/05 19:00 | 11.9 | 7.9 | 34.1 | 31.5 | 32.8 | 99.6 |
| 2015/06/05 20:00 | 17.1 | 12.2 | 34.5 | 31.9 | 33.6 | 99.7 |
| 2015/06/05 21:00 | 12.4 | 7.9 | 35.3 | 32.4 | 33.7 | 98.8 |
| 2015/06/05 22:00 | 13.2 | 9.1 | 34.7 | 31.3 | 32.4 | 100.4 |
| 2015/06/05 23:00 | 15.2 | 13.6 | 34.6 | 33.4 | 30.9 | 8.6 |

|  |  | PLACE OF DEGRADATION | DEGRADATION INDEX |
|---|---|---|---|
| AIR CONDITIONER | ABSORPTION TYPE | CONTAMINATION OF COOLANT | HEAT EXCHANGE QUANTITY OF CONDENSER |
|  |  | LOSS OF VACUUM | HEAT EXCHANGE QUANTITY OF ABSORBER |
|  | GHP | DEGRADATION OF ENGINE | FREQUENCY OF ENGINE STALL |
|  | EHP | TAINT OF FILTER | INCREASE IN POWER CONSUMPTION |
| REFRIGERATION FACILITY | SC | DEGRADATION OF HEAT EXCHANGER | HEAT EXCHANGE QUANTITY AT EVAPORATOR |
|  | REFRIGERATOR | DEGRADATION OF HEAT EXCHANGER | HEAT EXCHANGE QUANTITY AT CONDENSER |

FIG. 8

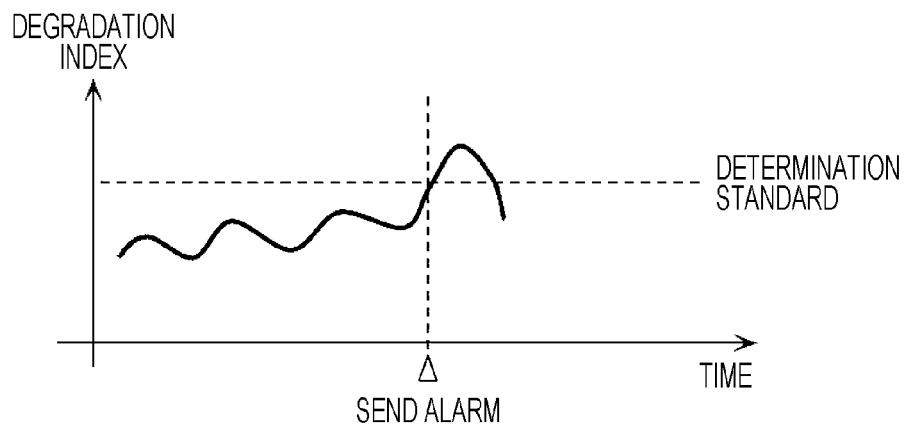

FIG. 9

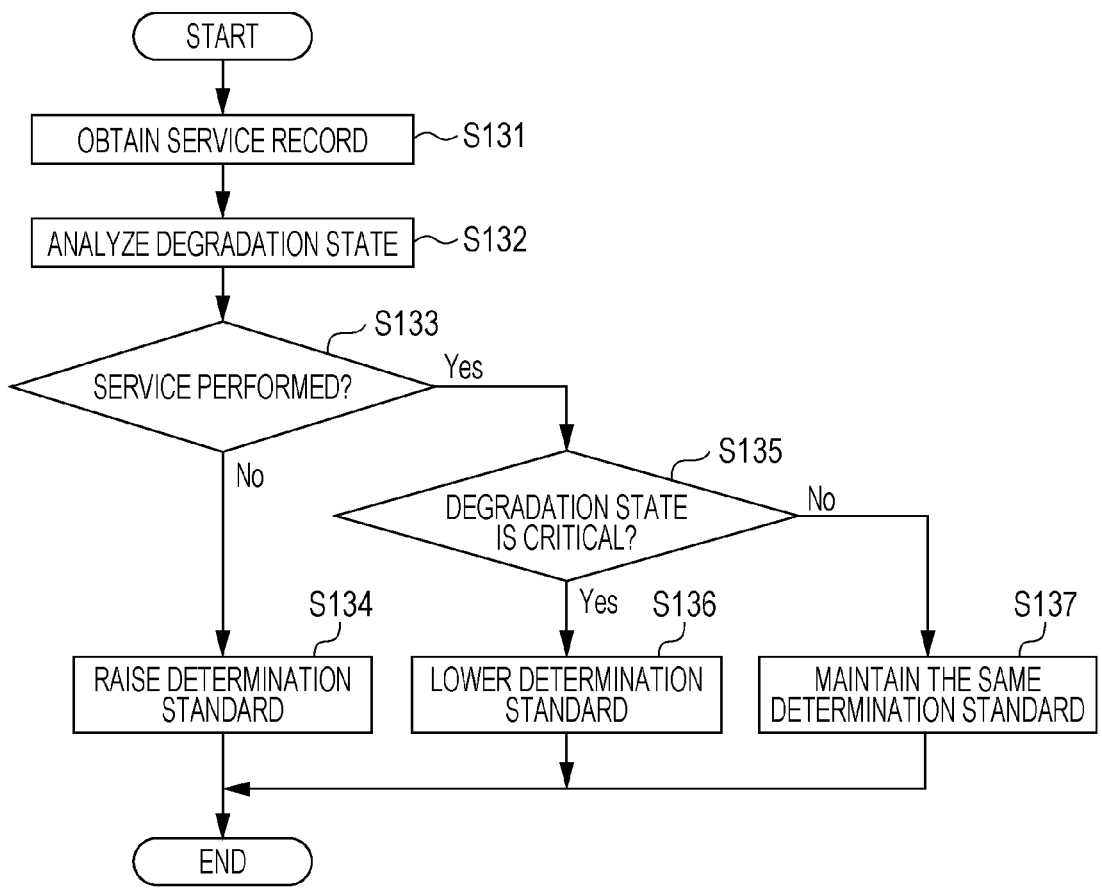

FIG. 10

| | NON-FORM RECORD |
|---|---|
| EXAMPLE 1: CASE OF MINOR DEGRADATION | SINCE COOLANT CONTAMINATION ALARM WENT OFF, VISITED THE SITE NEXT DAY AND ADDED WATER TREATMENT AGENT FOR PREVENTING COOLANT WATER CONTAMINATION. |
| EXAMPLE 2: CASE OF CRITICAL DEGRADATION | SINCE COOLANT CONTAMINATION ALARM WENT OFF, CHECKED COOLANT CONTAMINATION IN THE SITE, AND FOUND OUT ATTACHMENT OF A LARGE AMOUNT OF HEAVY STAIN. BRUSH CLEANED. |
| EXAMPLE 3: CASE OF NO DEGRADATION | VISITED THE SITE IN THE NEXT DAY OF DISPLAY MESSAGE. CHECKED DISPLAY AND FOUND NO DISPLAY. OPERATION IS CHECKED AND FOUND IN GOOD CONDITION. KEEP MONITORING WITHOUT TAKING ANY ACTION. |

| | KEYWORD |
|---|---|
| SERVICE PERFORMED | CONFIRM STAIN, ATTACHMENT, CLEANING, ADDITION, ... |
| NO SERVICE PERFORMED | NO DISPLAY, KEEP MONITORING, NO STAIN IS FOUND |

145

| | KEYWORD |
|---|---|
| CRITICAL DEGRADATION | CRITICAL, VERY, LARGE AMOUNT, ...<br>BRUSH CLEAN, ...<br>RESPONDED THE SAME DAY, ... |
| OTHER THAN ABOVE | DO NOT INCLUDE ANY OF THE KEYWORDS DESCRIBED ABOVE |

146

| | KEYWORD |
|---|---|
| RAISE DETERMINATION STANDARD | RAISE DETERMINATION STANDARD SLIGHTLY<br>RAISE DETERMINATION STANDARD BY +10<br>DETERMINATION STANDARD IS TOO LOW<br>... |
| LOWER DETERMINATION STANDARD | DETERMINATION STANDARD SHOULD BE LOWERED<br>LOWER DETERMINATION STANDARD TO 80 % OF CURRENT LEVEL<br>DETERMINATION STANDARD IS TOO HIGH<br>... |

DEGRADATION ESTIMATION METHOD AND DEGRADATION ESTIMATION APPARATUS

BACKGROUND

1. Technical Field

The present disclosure relates to degradation estimation methods and degradation estimation apparatuses.

2. Description of the Related Art

In management of devices that need maintenance, such as large-size air conditioners and the like, there is a well-known technique that estimates a degradation state of the device using operation data and the like, which are obtained by an internal sensor of the device. For example, in Japanese Patent No. 3340814, a determination standard of degradation is formulated in advance, and using this determination standard, the degradation state is estimated. Further, in Japanese Patent No. 5621888, the degradation state is estimated by comparing current operation information and past operation information.

SUMMARY

However, in such a system, it is desirable to estimate the degradation state with higher accuracy.

One non-limiting and exemplary embodiment provides a degradation estimation method or degradation estimation apparatus, which enables achievement of highly accurate degradation state estimation.

In one general aspect, the techniques disclosed here feature a degradation estimation method including: a service record acquiring step acquiring a service record of maintenance of a device; an analysis step analyzing a degradation state of the device from the service record; a determination standard adjustment step adjusting a first determination standard to a second determination standard depending on the analyzed degradation state, the first determination standard being determined in advance for estimating whether there is degradation of the device or not; a device data acquisition step acquiring first device data indicating state of the device; and a first degradation estimation step estimating whether there is degradation of the device or not using the acquired first device data and the second determination standard.

The present disclosure enables to provide a degradation estimation method or degradation estimation apparatus, which enable achievement of highly accurate degradation state estimation.

It should be noted that these general or specific aspects may be implemented by a system, a method, an integrated circuit, a computer program, or a computer readable storage medium such as a CD-ROM and the like, or may be implemented by any combination of a system, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of operation at time of alarm notification according to an embodiment;

FIG. 6 is a diagram illustrating an example of device data according to an embodiment;

FIG. 7 is a diagram illustrating an example of degradation index according to an embodiment;

FIG. 8 is a diagram for illustrating a degradation estimation process according to an embodiment;

FIG. 9 is a flowchart of a determination standard adjustment process at time of alarm notification according to an embodiment;

FIG. 10 is a diagram illustrating an example of non-form record according to an embodiment;

DETAILED DESCRIPTION

Figure 1:
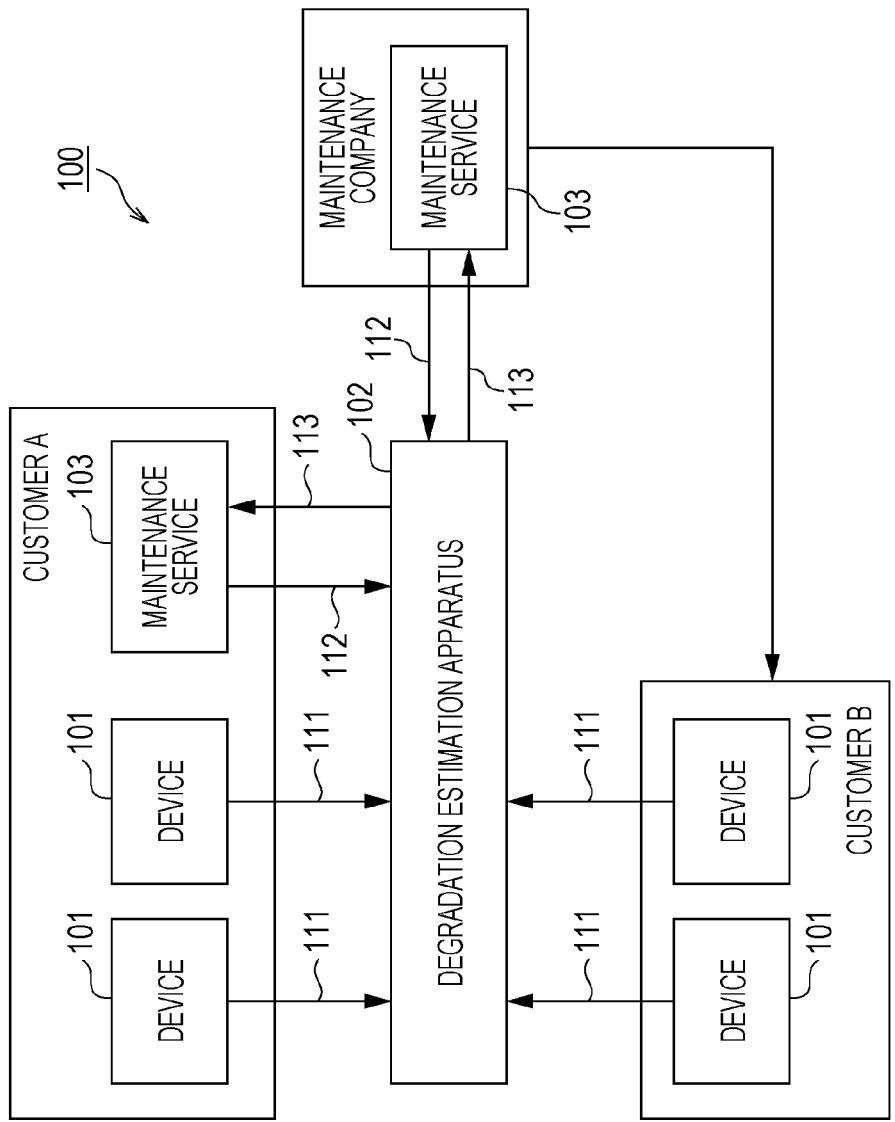
FIG. 1 is a diagram illustrating a configuration of a degradation estimation system according to an embodiment.

Underlying Knowledge Forming Basis of the Present Disclosure

In management of devices such as large-size air conditioners and the like, it is desirable to prevent troubles and inconvenience such as failures and performance degradation and achieve a high quality, long life operation.

For example, the degradation level of an absorption-type refrigerator gradually advances. Accordingly, failures may not occur at the time of light load operation in early spring and the like, but may start to occur due to shortage of refrigeration capability in summer season where the load becomes heavier. Thus, it is desirable to identify presence or absence of degradation before it develops to a failure and prevents a failure from happening by taking appropriate measures.

In the present embodiment, a system or an apparatus that achieves highly accurate degradation estimation by adjusting a determination standard to be used in an estimation of degradation state using a record of a maintenance performed by service personnel and the like.

Here, "there is degradation" (presence of degradation) means that the degradation level exceeds a standard, and means, for example, a state where performance is lower than normal, but an operation can be continued. Further, a process of estimating presence or absence of degradation (estimating whether there is degradation or not) is referred to as a degradation estimation. Further, an estimation (or analysis and the like) of degradation state includes an estimation (or analysis and the like) of at least one of the presence or absence of degradation and the degradation level.

A degradation estimation method according to one aspect of the present disclosure includes: a service record acquiring step acquiring a service record of maintenance of a device; an analysis step analyzing a degradation state of the device from the service record; a determination standard adjustment step adjusting a first determination standard to a second determination standard depending on the analyzed degradation state, the first determination standard being determined in advance for estimating whether there is degradation of the device or not; a device data acquisition step acquiring first device data indicating state of the device; and a first degradation estimation step estimating whether there is degradation of the device or not using the acquired first device data and the second determination standard.

This enables the adjustment of the determination standard based on the service record. This increases the accuracy of the degradation estimation because the degradation estimation can be performed using an appropriate determination standard even when a determination standard that is originally set in advance is not appropriate.

For example, the service record may be a service record in a free style format.

Accordingly, learning may be performed using not only a formatted service record, but also a non-formatted service record. This allows receiving free style input from service personnel without preparing service record items or a format in advance, and allows the learning with more variety of information. Accordingly, the accuracy of the degradation estimation may be improved.

For example, in the analysis step, it is determined, from the service record, whether the degradation of the device advances further than a standard or not, and in the determination standard adjustment step, when determined that the degradation of the device advances further than the standard, the second determination standard may be set lower than the first determination standard.

For example, in the first degradation estimation step, the device is estimated as having degradation when a first degradation index is greater than the second determination standard, the first degradation index being calculated based on the first device data, and in the determination standard adjustment step, when determined that the degradation of the device advances further than the standard, the second determination standard may be set between the first determination standard and a second degradation index, the second degradation index being calculated from second device data indicating a state of the device after the maintenance is performed.

For example, in the analysis step, the presence or absence of the degradation of the device is determined from the service record, and in the determination standard adjustment step, when determined that there is no degradation of the device, the second determination standard may be set higher than the first determination standard.

For example, in the first degradation estimation step, the device is estimated as having degradation when a first degradation index is greater than the second determination standard, the first degradation index being calculated based on the first device data, and in the determination standard adjustment step, when it is estimated that no service is performed, the second determination standard may be set higher than a maximum value of a third degradation index, the maximum value of the third degradation index being calculated from third device data indicating a state of the device in a predetermined period up to time the maintenance is performed.

For example, the degradation estimation method may further include, before the service record acquisition step, a fourth device data acquisition step acquiring fourth device data indicating the state of the device before the state indicated by the first device data; a second degradation estimation step estimating whether there is degradation of the device or not using the acquired fourth device data and the first determination standard; and a notification step sending an alarm when estimated that there is degradation of the device in the second degradation estimation step, wherein the maintenance may be a maintenance of the device performed in response to the alarm sent.

For example, the maintenance may be a maintenance performed regularly.

For example, the degradation estimation method may generate determination standards for each customer to which a plurality of devices belongs, the plurality of devices including the device, the determination standards being different from each other.

This enables achievement of appropriate degradation estimation matched with each customer's environment and the like.

For example, in the determination standard adjustment step, when determined that the first determination standard is to be adjusted to the second determination standard, an inquiry may be sent to a user to ask whether the user approves this adjustment or not, and when the user approves the adjustment, the first determination standard may be adjusted to the second determination standard.

For example, in the analysis step, it may be determined whether the service record includes a description suggesting an adjustment of the first determination standard or not, and in the determination standard adjustment step, when the service record includes a description suggesting an adjustment of the first determination standard, the first determination standard may be adjusted to the second determination standard.

Further, a degradation estimation apparatus according to one aspect of the present disclosure includes: a service record acquisition portion that acquires a service record of maintenance of a device; an analysis portion that analyzes a degradation state of the device from the service record; a determination standard adjustment portion that adjusts a first determination standard to a second determination standard depending on the degradation state analyzed, the first determination standard being determined in advance for estimating whether there is degradation of the device or not; a device data acquisition portion that acquires first device data indicating state of the device; and a degradation estimation portion that estimates whether there is degradation of the device or not using the first device data acquired and the second determination standard.

This enables adjustment of the determination standard based on the service record. This increases the accuracy of the degradation estimation because the degradation estimation can be performed using an appropriate determination standard even when a determination standard that is originally set in advance is not appropriate.

It should be noted that these general or specific aspects may be implemented by a system, a method, an integrated circuit, a computer program, or a computer readable storage medium such as a CD-ROM and the like, or may be implemented by any combination of a system, a method, an integrated circuit, a computer program, and a storage medium.

Hereinafter, embodiments are described in detail with reference to the drawings.

It should be noted that embodiments which will be described below each illustrate a specific example of the present disclosure. Numeric values, shapes, materials, constituting elements, arrangement positions and connection modes of the constituting elements, steps, sequences of the steps, and the like, which may be described in the following embodiments, are merely examples, and not intended to limit the present disclosure. Further, of constituting elements in the following embodiments, constituting elements that are not described in an independent claim representing the broadest concept will be described as optional constituting elements.

Embodiments

A degradation estimation apparatus according to the present embodiment adjusts a determination standard to be used for estimating a degradation state using records of maintenance performed by service personnel and the like. This enables the degradation estimation apparatus to achieve highly accurate degradation estimation.

First, the configuration of a degradation estimation system 100 according to the present embodiment is described. FIG. 1 is a diagram illustrating the configuration of the degradation estimation system 100 according to the present embodiment.

As illustrated in FIG. 1, the degradation estimation system 100 includes, for example, a device 101 that is, for example, a large size air conditioner, a degradation estimation apparatus 102 that estimates a state of the device 101, and a maintenance service 103 that perform maintenance of the device 101. The device 101 is not limited to the large size air conditioner and may be any device. For example, the device 101 may be facility equipment inside a building, manufacturing equipment in a factory, or industrial equipment, which needs maintenance.

Further, the maintenance service 103 is not limited to services of a customer support department, and may be in some case services of a design department where devices are being developed or services of a sales department that deals with users.

For example, as in an example of a customer A, the maintenance service 103 is provided in a customer-by-customer basis. By each maintenance service 103, maintenance is performed on one or more devices 101 belonging to the same customer.

Alternatively, as in an example of a customer B, the maintenance service 103 may include an outside professional maintenance service company. In this case, it is not necessary to have the maintenance service 103 for each customer.

Here, the example describes a case where the number of customers are two and two devices 101 belong to each customer. However, any numbers of the customers and the devices 101 may be used.

The degradation estimation apparatus 102 is, for example, a server connected to the device 101 and the maintenance service 103 via networks. This server may be of a cloud server type or an on-premise type, and is not limited to a certain system architecture.

The degradation estimation apparatus 102 obtains device data 111 from the device 101. The device data 111 indicates a device state and includes, for example, setup values of the device 101 and measurement values and the like of device characteristics detected by sensors installed in the device 101.

Further, the degradation estimation apparatus 102 obtains service records 112 from the maintenance service 103. The service record 112 is a record of service performed for the maintenance of the device 101, and is, for example, a record of work performed by service personnel of the maintenance service 103 for the maintenance of the device 101 such as repair, general servicing, cleaning, and the like, and a record of visual inspection.

The degradation estimation apparatus 102 sends an alarm 113 to the maintenance service 103 when the device data 111 meets a determination standard. Further, the degradation estimation apparatus 102 adjusts the determination standard using the service record 112.

Figure 2:
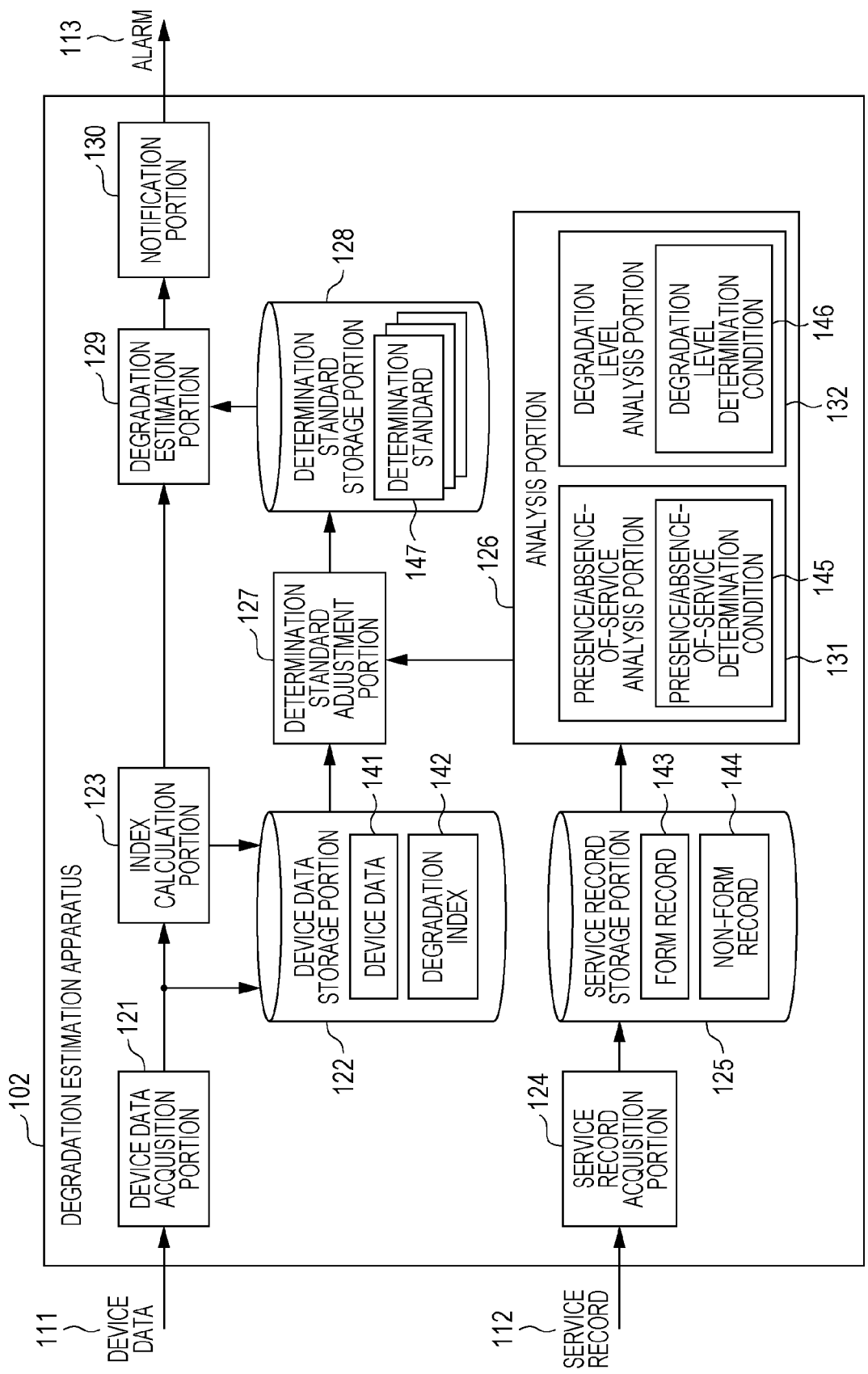
FIG. 2 is a block diagram of a degradation estimation apparatus according to an embodiment.

Next, the configuration of the degradation estimation apparatus 102 is described in detail. FIG. 2 is a block diagram of the degradation estimation apparatus 102. As illustrated in FIG. 2, the degradation estimation apparatus 102 includes a device data acquisition portion 121, a device data storage portion 122, an index calculation portion 123, a service record acquisition portion 124, a service record storage portion 125, an analysis portion 126, a determination standard adjustment portion 127, a determination standard storage portion 128, a degradation estimation portion 129, and a notification portion 130.

The device data acquisition portion 121 sequentially obtains the device data 111 from the device 101 and stores the obtained device data 111 in the device data storage portion 122 as device data 141.

The index calculation portion 123 calculates a degradation index 142 quantitatively representing a degradation level of the device 101 from the device data 111 obtained by the device data acquisition portion 121, and outputs the calculated degradation index 142 to the degradation estimation portion 129 and stores this calculated degradation index 142 in the device data storage portion 122.

The service record acquisition portion 124 sequentially obtains the service record 112 from the maintenance service 103 and stores the obtained service record 112 in the service record storage portion 125. Here, the service record 112 includes a form record and a non-form record, and they are stored as a form record 143 and a non-form record 144. Here, the form record is information whose items are predefined. Whereas, the non-form record is non-form information such as a free-style service log and the like, whose format is not standardized.

The analysis portion 126 analyses the degradation state of the device 101 (or the detail of the service) using the form record 143 and the non-form record 144 included in the service record 112. The analysis portion 126 includes a presence/absence-of-service analysis portion 131 and a degradation level analysis portion 132.

The presence/absence-of-service analysis portion 131 determines presence or absence of degradation of the device 101 (or whether any service is performed during the maintenance or not) from the non-form record 144 using a retained presence/absence-of-service determination condition 145. The degradation level analysis portion 132 determines the degradation level of the device 101 (or a level of service of the maintenance) from the non-form record 144 using a retained degradation level determination condition 146.

The determination standard adjustment portion 127 adjusts a determination standard 147 stored in the determination standard storage portion 128 depending on the degradation state of the device 101 that has been analyzed by the analysis portion 126. In other words, depending on the analyzed degradation state, the determination standard adjustment portion 127 adjusts a first determination standard, which is predetermined for determining whether any degradation is present in the device 101 or not, to a second determination standard.

For example, the determination standard 147 is set up on a customer-by-customer basis. The determination standard 147 may be set up for each device 101 or a common determination standard 147 may be used by a plurality of the devices 101 or a plurality of customers. In other words, for every device 101 or for every customer to which a plurality of the devices 101 belongs, a different determination standard 147 may be used. Alternatively, the determination standard 147 may be set for each type of degradation.

The degradation estimation portion 129 estimates the degradation state of the device 101 from the device data 111 using the determination standard 147. Specifically, the degradation estimation portion 129 estimates whether any degradation is present in the device 101 or not.

When it is estimated that degradation is present in the device 101, the notification portion 130 sends the alarm 113 to the maintenance service 103.

In the present embodiment, to make a distinction between processes, generally, the degradation state determination process by the degradation estimation portion 129 based on the determination standard 147 is referred to as "estimation", and the degradation state determination process by the analysis portion 126 based on the service record is referred to as "analysis". Further, the specific determination process regarding the presence or absence of degradation or the degradation level performed in the degradation estimation portion 129 and the analysis portion 126 is referred to as "determination".

Next, the operation of the degradation estimation apparatus 102 is described. For the sake of simplification, the operation is described for one device 101 in the following description. First, an outline of operation to be subjected to an adjustment process of the determination standard 147 is described. As operations to be subjected to the adjustment process, two operation examples illustrated in FIG. 3A and FIG. 3B are assumed.

Figure 3A:
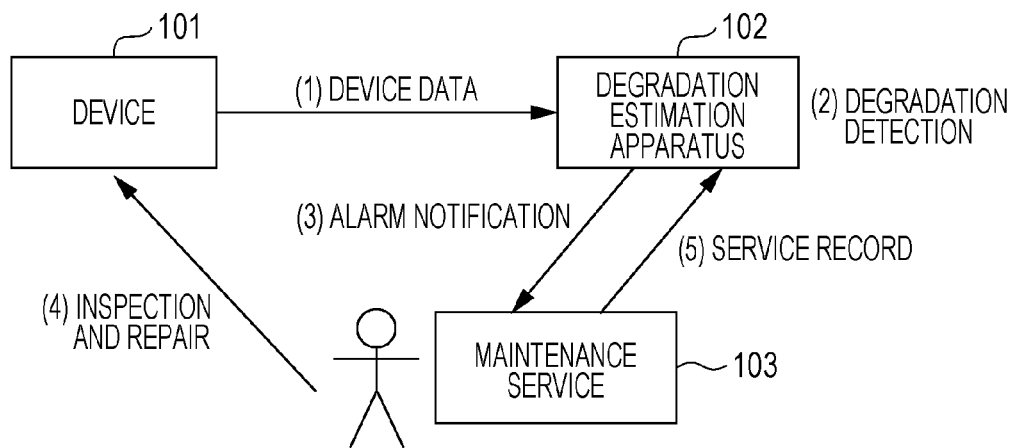
FIG. 3A is a diagram illustrating an outline of operation at time of alarm notification according to an embodiment.

FIG. 3A is a diagram illustrating an outline of process when a maintenance is performed in response to a notification of the alarm 113. First, the degradation estimation apparatus 102 detects degradation based on the device data 111 received from the device 101. This causes the alarm 113 to be sent to the maintenance service 103, and service personnel performs maintenance (inspection and repair) of the device 101. A result of the maintenance is sent to the degradation estimation apparatus 102 as a service record 112, and the degradation estimation apparatus 102 adjusts the determination standard 147 based on the service record 112.

Figure 3B:
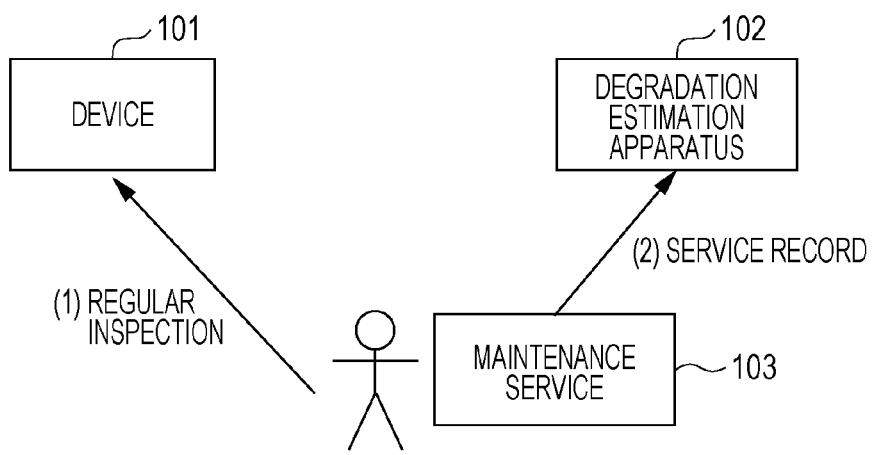
FIG. 3B is a diagram illustrating an outline of operation at time of regular inspection according to an embodiment.

FIG. 3B is a diagram illustrating an outline of process at the time of regular inspection. First, service personnel perform a regular inspection of the device 101. Here, the regular inspection (maintenance) is service work regularly performed by service personnel for the maintenance (checking the state of the device 101) of the device 101, and may further include repair or servicing as needed. A result of the general inspection is sent to the degradation estimation apparatus 102 as a service record 112, and the degradation estimation apparatus 102 adjusts the determination standard 147 based on the service record 112.

Next, a process when a maintenance is performed in response to a notification of the alarm 113 is described in detail. FIG. 4 is a diagram illustrating an operation sequence in this case. First, the device 101 sequentially sends device data 111 to the degradation estimation apparatus 102 (S101). The degradation estimation apparatus 102 obtains the device data 111 and determines presence or absence of degradation in the device 101 based on the obtained device data 111. In this case, the degradation estimation apparatus 102 estimates that there is no degradation (does not meet a determination standard) (S102). After that, with regard to device data 111 received at the step S103, the degradation estimation apparatus 102 estimates there is degradation (meets the determination standard) (S104).

When it is estimated that there is degradation, the degradation estimation apparatus 102 sends the alarm 113 to the maintenance service 103 (S105). This causes the alarm 113 to go off at the maintenance service 103 (S106), and maintenance of the device 101 is performed by service personnel (S107). Further, a service record 112 describing details of the maintenance is produced, and this service record 112 is registered in the degradation estimation apparatus 102 (S108).

The degradation estimation apparatus 102 changes the determination standard 147 using this new service record 112 (S109) and, for device data 111 (first device data) that is subsequently received, performs a degradation estimation process using a determination standard 147 thus changed (second determination standard) (S110, S111).

Figure 5:
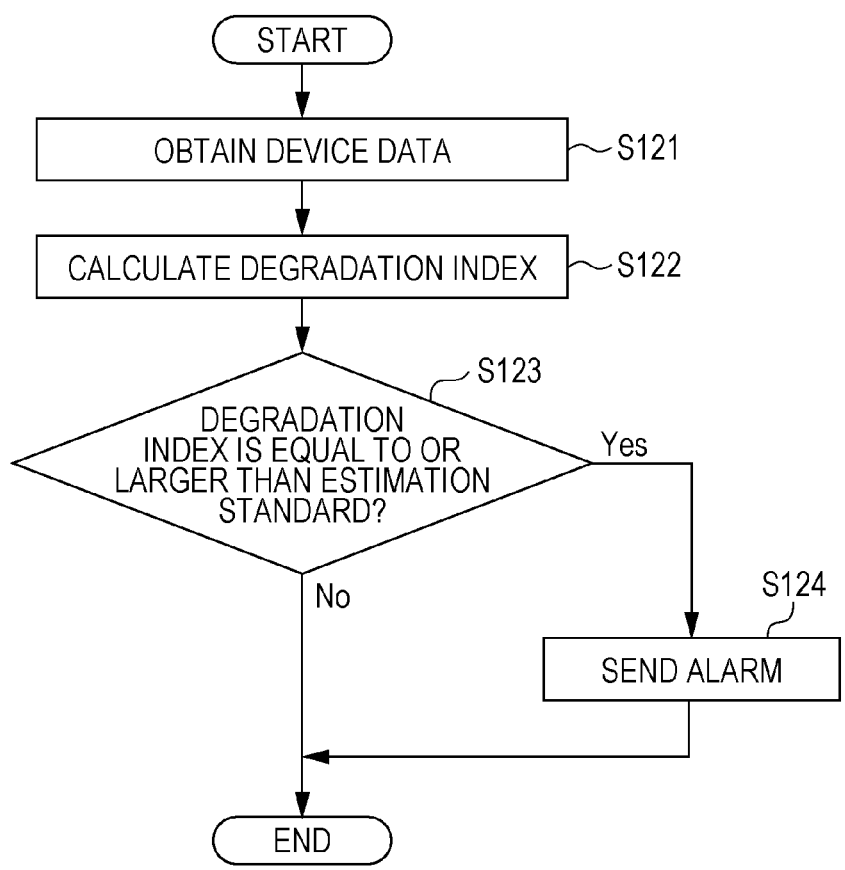
FIG. 5 is a flowchart of a degradation estimation process according to an embodiment.

Next, the process of the degradation estimation apparatus 102 in such case is described. First, the degradation estimation process by the degradation estimation apparatus 102 is described. FIG. 5 is a flowchart of the degradation estimation process to be performed by the degradation estimation apparatus 102. The process of FIG. 5 is repeated, for example, every time new device data 111 is obtained.

First, the device data acquisition portion 121 obtains the device data 111 from the device 101 (S121). FIG. 6 is a diagram illustrating an example of the device data 141. As illustrated in FIG. 6, the device data 141 includes time information 151 and detection data 152. The time information 151 indicates time the detection data 152 is detected. The detection data 152 is setup values of the device 101 or measurement values detected by sensors included in the device 101. In other words, the device data 141 indicates measurement values of characteristics of the device 101 or time changes of the setup values of the device 101. The items of the detection data 152 illustrated in FIG. 6 are of an example. The items of the detection data 152 are not limited thereto, and may include any other items. When the device is a high-performance device, a result obtained by performing a predetermined operation on a setup value or a measurement value may be used as the setup value or the measurement value. Further, the measurement values of the detection data 152 are not limited to instant values at the time and date of detection described in the time information 151. For example, in order to suppress an effect of sensor malfunction or an effect of measurement fluctuation, an average value or a weighted average value of data measured during a certain period before and after the time and date of detection, using it as a reference point of time.

Next, the index calculation portion 123 calculates a degradation index from the device data 111 (S122). FIG. 7 is a diagram illustrating examples of the degradation index. Here, an absorption-type refrigerator illustrated in FIG. 7 is a large-size air conditioner for use in a commercial facility and the like, a gas heat pump (GHP) is an air conditioner operated with a gas engine, an electric heat pump (EHP) is an air conditioner operated with an electric motor, and a refrigeration facility is a facility of refrigeration for business use and the like and consists of a showcase (SC) for displaying merchandise and a refrigerator. For example, as illustrated in FIG. 7, heat exchange quantity of a condenser may be used as a degradation index for contamination of coolant of the absorption-type refrigerator. Further, heat exchange quantity of an absorber may be used as a degradation index for a decrease in the degree of vacuum at the absorption-type refrigerator. Further, frequency of engine stall may be used as a degradation index for degradation of engine of GHP. An increase amount in power consumption of EHP may be used as a degradation index for dirtiness of a filter of EHP.

Further, heat exchange quantity of an evaporator may be used as a degradation index for degradation of a heat exchanger of SC, and heat exchange quantity of a condenser may be used as a degradation index for degradation of a heat exchanger of the refrigerator.

Next, as an example, a calculation method of a degradation index for determining coolant contamination is described. For example, the degradation index for determining coolant contamination is calculated by the following equation (Equation 1).

$$\text{Degradation index} = \Delta T / Q \quad \text{(Equation 1)}$$

where Q indicates refrigeration capability and is represented by the following equation (Equation 2).

$$Q = \alpha \times (\text{cold water outlet temperature} - \text{cold water inlet temperature}) \times \text{cold water flow rate} \quad \text{(Equation 2)}$$

Further, $\Delta T$ is a logarithmic average temperature difference at a condenser and is represented by the following equation (Equation 3).

$$\Delta T = \frac{\Delta T_1 - \Delta T_2}{\ln\left(\frac{\Delta T_1}{\Delta T_2}\right)} \left(\frac{V}{V_0}\right) \gamma \quad \text{(Equation 3)}$$

where $\Delta T_1$ is temperature difference at a condenser inlet, $\Delta T_2$ is temperature difference at a condenser outlet, V is coolant flow, $V_0$ is a standard value of coolant flow rate, and $\gamma$ is a coefficient (for example, one).

Next, the degradation estimation portion 129 determines whether the degradation index is equal to or greater than a determination standard (S123). When the degradation index is less than the determination standard (No at S123), the degradation estimation apparatus 102 estimates that there is no degradation in the device 101, and the process ends. Subsequently, the degradation estimation apparatus 102 performs the process of the step S121 and thereafter on the next device data 111.

On the other hand, when the degradation index is equal to or greater than the determination standard 147 (Yes at S123), the degradation estimation apparatus 102 estimates that there is degradation in the device 101, and the notification portion 130 sends the alarm 113 to the maintenance service 103 (S124).

FIG. 8 is a diagram illustrating an example of this degradation estimation process. As illustrated in FIG. 8, the degradation index increases as time passes, and when the degradation index surpasses the determination standard, the alarm 113 indicating degradation of the device 101 is sent out.

Next, details of the adjustment process of determination standard by the degradation estimation apparatus 102 is described. FIG. 9 is a flowchart of the adjustment process of determination standard to be performed by the degradation estimation apparatus 102. The process illustrated in FIG. 9 is performed every time the service record 112 is obtained, the service record 112 indicating details of the maintenance of the device 101 performed in response to the alarm 113.

First, the service record acquisition portion 124 obtains the service record 112 from the maintenance service 103 and stores the obtained service record 112 in the service record storage portion 125 as the form record 143 and the non-form record 144 (S131). The non-form record 144 is, for example, as illustrated in FIG. 10, text data written in free format. Alternatively, the non-form record 144 may be voice data or image data. In that case, the voice data or the image data are converted to text data by voice recognition or image recognition.

For example, the non-form record 144 may be written in free format like a log or journal, and indicates items such as environments (weather, temperature), reason for visit, user's comment, details of checking by service personnel and his/her observation, detail of service personnel's work, situation after the work and his/her observation, and matters to be hand over. The non-form record 144 may be in a format in which some items are stylized.

The form record 143 indicates items like time and data, customer information, information on personnel in charge, device type information, installation location, operating time, setup values, measurement data, replacement component information, check list of service work and the like, and handled items in a format. At least some of these items may be indicated in the non-form record 144.

Next, the analysis portion 126 analyzes the degradation state of the device 101 using the form record 143 and the non-form record 144 (S132). The service record 112 may include only the non-form record. Next, a process for analyzing the degradation state from the non-form record 144.

Specifically, in the analysis of the degradation state (S132), the presence/absence-of-service analysis portion 131 determines whether a service is performed in the maintenance or not (presence or absence of degradation of the device 101) using the presence/absence-of-service determination condition 145. Here, the service is a repair, servicing, cleaning, or the like, and means a service work to improve the degradation of the device 101.

Figures 11, 12:
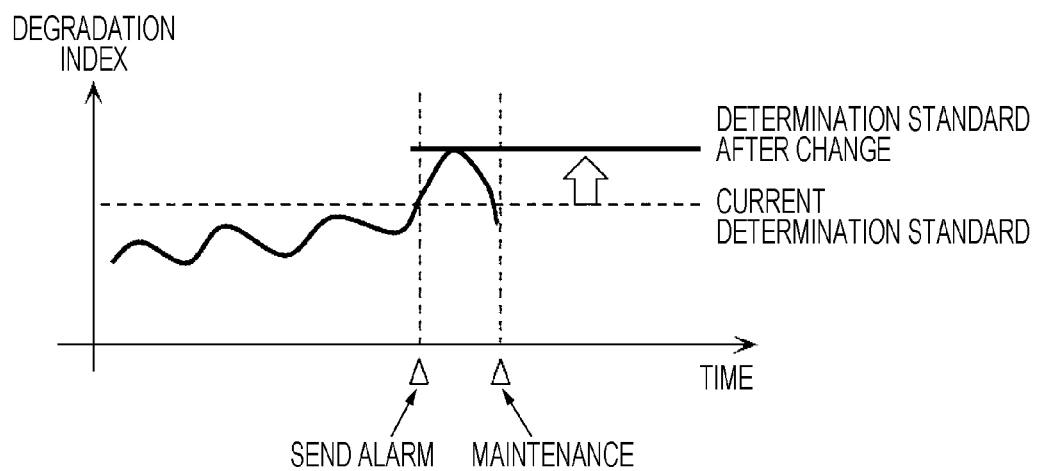
FIG. 11 is a diagram illustrating an example of presence/absence-of-service determination condition according to an embodiment.
FIG. 12 is a diagram illustrating an example of operation in a case where a determination standard is raised according to an embodiment.

FIG. 11 is a diagram illustrating an example of the presence/absence-of-service determination condition 145. For example, as illustrated in FIG. 11, a plurality of keywords is set up in advance for each of "service is performed" and "no service is performed". The presence/absence-of-service analysis portion 131 determines that a service is performed when the non-form record 144 includes any of the keywords associated with "service is performed", and determines that a service is not performed when the non-form record 144 includes any of the keywords associated with "no service is performed".

Although FIG. 11 illustrates the keywords for each of "service is performed" and "no service is performed", keywords may be setup only for one of these two states, and the presence/absence-of-service analysis portion 131 may determines that a case is in the other state when none of such keywords is included in the non-form record 144. For example, in a case where some keywords are setup only for "service is performed" and none of such keywords is included in the non-form record 144, the presence/absence-of-service analysis portion 131 may determines the case is "no service is performed".

When the presence/absence-of-service analysis portion 131 determines that no service is performed (No at S133), the determination standard adjustment portion 127 performs an adjustment to set the determination standard higher than the current determination standard (S134). In other words, when the presence/absence-of-service analysis portion 131 determines that there is no degradation of the device 101 (No at S133), the determination standard adjustment portion 127 sets a determination standard after the adjustment (the second determination standard) at a higher position than the current determination standard (the first determination standard).

FIG. 12 is a diagram illustrating an example of this operation. As illustrated in FIG. 12, the determination standard adjustment portion 127 sets the determination standard higher than a maximum value of the degradation index during a predetermined period up to the time that the maintenance is performed. For example, the determination standard adjustment portion 127 sets the determination standard to a value higher than a maximum value of the degradation index in a period from sending of the alarm 113 until the time that the maintenance is performed. In other words, the determination standard adjustment portion 127 sets the determination standard after the adjustment (the second determination standard) to a value higher than a maximum value of a third degradation index, which is calculated from third device data representing the state of the device 101 in the predetermined period until the time that the maintenance is performed.

Further, in the analysis of the degradation state (S132), the degradation level analysis portion 132 determines the degradation level of the device 101 using the degradation level determination condition 146. In other words, the degradation level analysis portion 132 determines whether the degradation of the device 101 is advanced or not, compared with a predetermined standard.

Figures 13, 14:
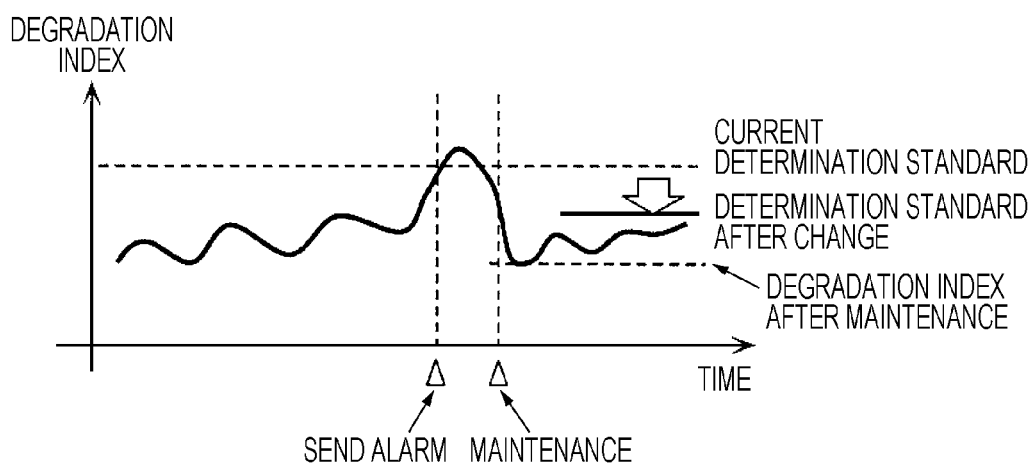
FIG. 13 is a diagram illustrating an example of degradation level determination condition according to an embodiment.
FIG. 14 is a diagram illustrating an example of operation in a case where a determination standard is lowered according to an embodiment.

FIG. 13 is a diagram illustrating an example of the degradation level determination condition 146. For example, as illustrated in FIG. 13, a plurality of keywords is set up in advance for at least one of the degradation levels. The degradation level analysis portion 132 determines that the degradation is critical when the non-form record 144 includes any of the keywords associated with "critical degradation", and determines that the degradation is not critical (mild degradation) when the non-form record 144 includes none of the keywords associated with "critical degradation". A keyword may be set for each of a plurality of degradation levels. Further, the degradation level of determination target may be classified into three or more kinds.

Here, as a way to determine the presence or absence of service and the degradation level from the non-form record 144, the example is described that uses a simple list in which the items and the terms are associated with each other. However, a correlation list or a combination of the simple list and the correlation list may alternatively be used. For example, the analysis portion 126 performs similarity searches or correlation searches of derived words for a word extracted from the non-form record 144, and, based on numerical results that are results of the searches, produces a simple list or a correlation list of words within a threshold as well as a combination of the simple list and the correlation list. Next, the analysis portion 126 may compare a word list obtained by the similarity search and word lists each produced in advance for a combination of failure item and level, and may determine, as a corresponding item (the presence or absence of service or the degradation level), the item associated with the word list identical to or having a higher degree of coincidence (the degree of coincidence is equal to or higher than a threshold) with the word list obtained by the similarity search.

Alternatively, as a specific way of the degradation state analysis process described above, a text mining process using the degree of connection between frequency of keyword appearance and lexicon may be used. For example, the analysis portion 126 produces a co-occurrence network using a numerical index such as Jaccard coefficient and the like. The analysis portion 126 extracts a lexicon set having strong connection using the produced co-occurrence network. Next, the analysis portion 126 determines the presence or absence of service or the degradation level by determining to which item the extracted lexicon set corresponds. In other words, the analysis portion 126 determines the item by performing a similarity matching process between the extracted lexicon set and a dictionary produced in advance.

In the above description, both the presence or absence of degradation (the presence or absence of service) and the degradation level are determined in the analysis of the degradation state. Alternatively, only one of the presence or absence of service and the degradation level may be determined. Further, instead of the presence or absence of service, the degradation level may be determined whether the degradation level is higher than the first determination standard or not. In other words, the degradation estimation apparatus 102 raises the determination standard when the degradation level is less than the first determination standard, lowers the determination standard when the degradation level is higher than the second determination standard, which is higher than the first determination standard, and does not need to change the determination standard when the determination standard is between the first determination standard and the second determination standard.

As described above, the analysis portion 126 analyzes the degradation state (the presence or absence of degradation, the degradation level) or the detail of service (the presence or absence of service, the level of service). Here, the degradation state and the detail of service correspond with each other. Thus, the detail of service can be estimated from the degradation state, and the degradation state can be estimated from the detail of service. For example, when a service is performed, it can be determined that there is degradation, and when the degradation is critical, it can be determined that the level of service is extensive. Accordingly, the analysis of the degradation state from the service record 112 is not limited to analysis of the degradation state directly from the service record 112, but also includes analysis of the detail of service from the service record 112 and subsequent determination of the degradation state from the analyzed detail of service.

Returning to FIG. 9, when it is determined that the degradation state is critical (degradation of the device 101 advances further than a standard) at step S135 (Yes at S135), the determination standard adjustment portion 127 performs an adjustment to set the determination standard lower than the current determination standard (S136). In other words, the determination standard adjustment portion 127 sets a determination standard after the adjustment (the second determination standard) at a lower position than the current determination standard (the first determination standard).

FIG. 14 is a diagram illustrating an example of this operation. As illustrated in FIG. 14, the determination standard adjustment portion 127 sets the determination standard to a value between the current determination standard and the degradation index after the maintenance (after the service). In other words, the determination standard adjustment portion 127 sets the determination standard after the adjustment (the second determination standard) to a value between the current determination standard (the first determination standard) and a second degradation index, which is calculated from second device data 111 representing the state of the device 101 after the maintenance is performed.

On the other hand, when it is not determined that the degradation state is critical at step S135, namely, when it is determined that the degradation state is mild degradation (No at S135), the determination standard adjustment portion 127 does not change the determination standard (S137).

As described above, in a case where no service is performed during the maintenance of the device 101 performed in response to the alarm 113, namely, the degradation of the device 101 is not so advanced to the point of sending the alarm 113, the degradation estimation system 100 according to the present embodiment prevents the alarm 113 from being sent out until the degradation index increases further by raising the determination standard. Further, in a case where the degradation is critical, namely, the notification of the alarm 113 is belated, the determination standard is lowered, thereby allowing the alarm 113 to be sent out at an earlier stage. In this way, the degradation estimation system 100 enables automatic adjustment of the determination standard in such a way that the estimation of the degradation state is performed more appropriately.

The degradation estimation apparatus 102 may perform learning not only using formatted service records, but also non-formatted service records. This allows receiving free style input from service personnel without preparing service record items or a format in advance, and allows the learning with more variety of information. Accordingly, the accuracy of the degradation estimation may be improved.

Figure 15:
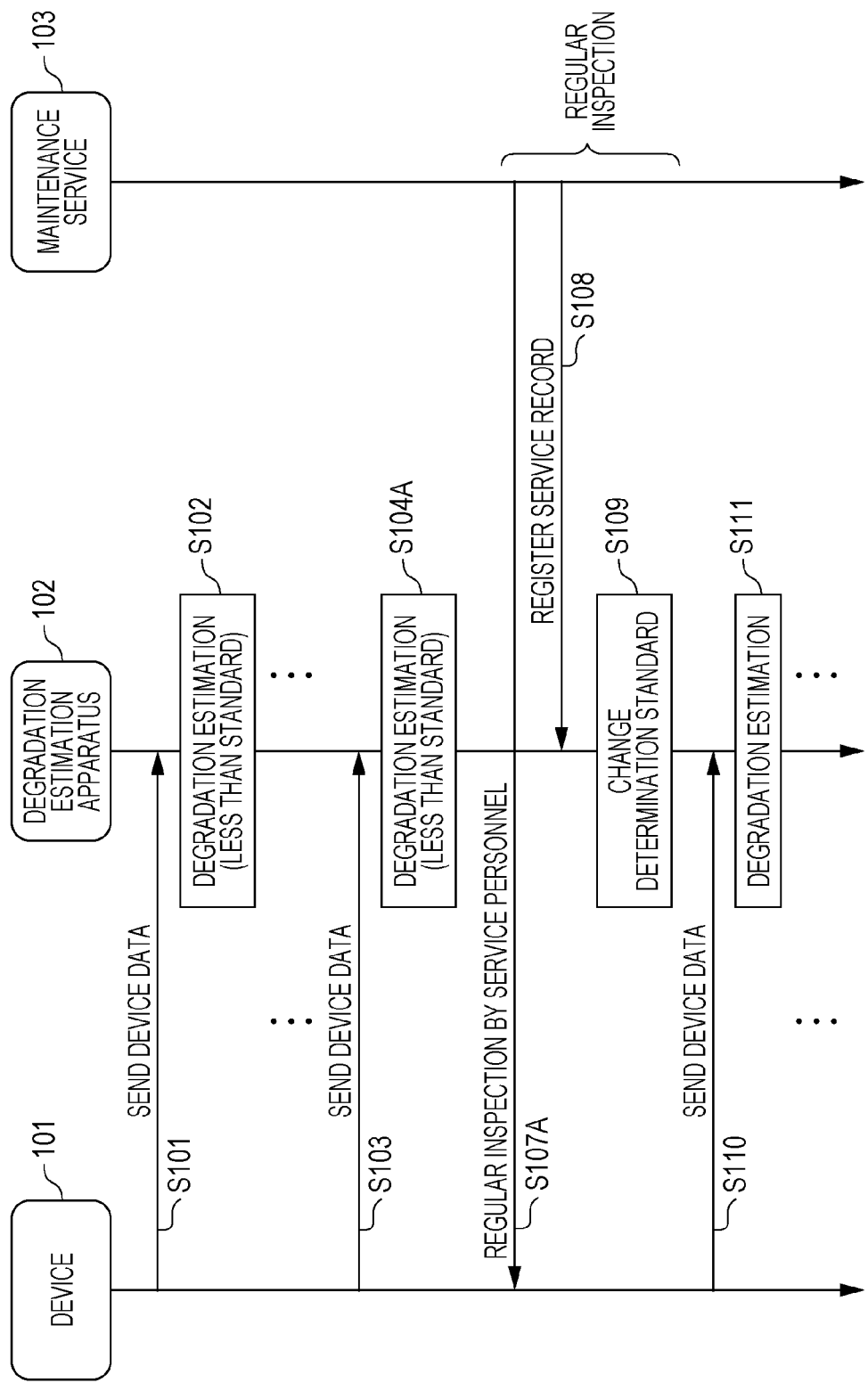
FIG. 15 is a diagram illustrating an example of operation at time of regular inspection according to an embodiment.

Next, a process at the time of regular inspection is described in detail. In the following description, mostly a difference from the time of sending the alarm 113 is described. FIG. 15 is a diagram illustrating an operation sequence in this case.

As is the process illustrated in FIG. 4, the degradation estimation apparatus 102 estimates the presence or absence of degradation of a device 101 using device data 111 every time the device data 111 is received from the device 101 (S101 to S104A). In this case, it is determined that there is no degradation in both determination (S102, S104A).

Subsequently, a regular inspection is performed at a predetermined timing (S107A). Further, a service record 112 describing detail of the regular inspection is produced, and this service record 112 is registered in the degradation estimation apparatus 102 (S108). Next, the degradation estimation apparatus 102 changes a determination standard 147 using a new service record 112 (S109) and, for device data 111 (S110) that is subsequently received, performs a degradation estimation process using a determination standard 147 thus changed (S111).

Figure 16:
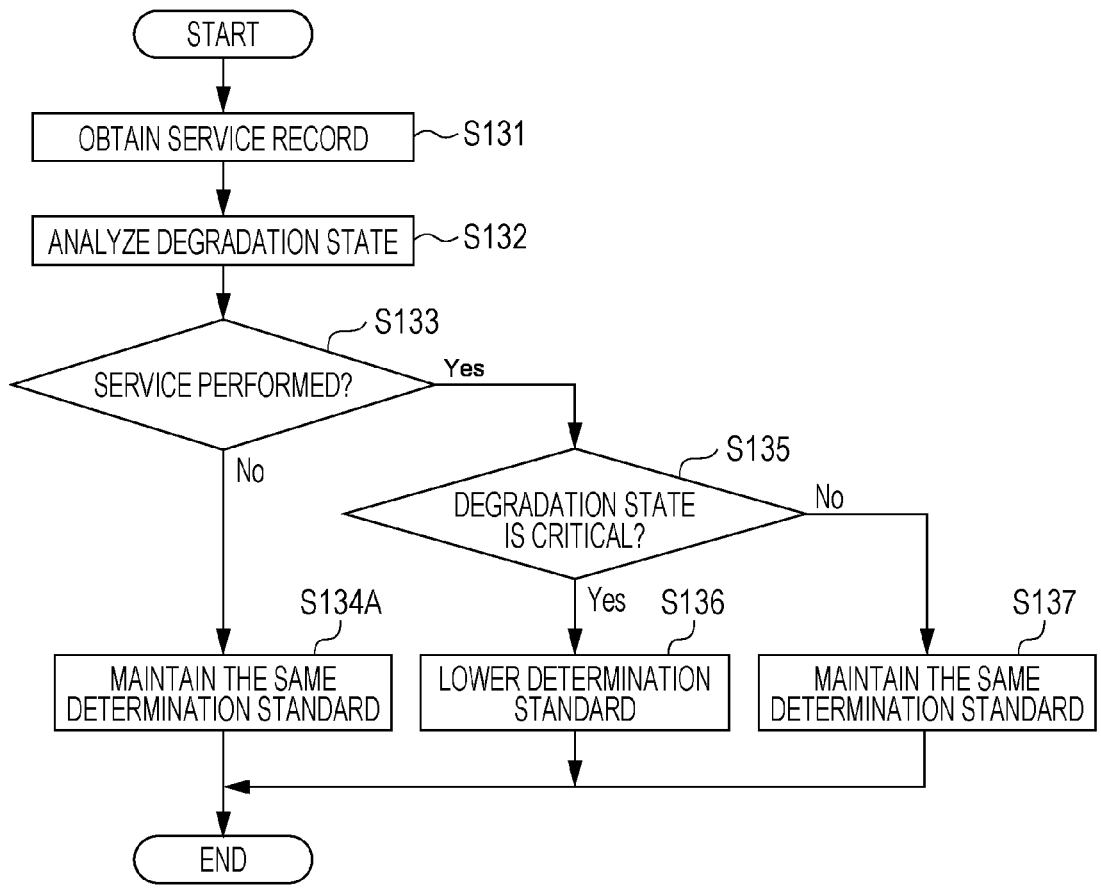
FIG. 16 is a flowchart of a determination standard adjustment process at time of regular inspection according to an embodiment.

FIG. 16 is a flowchart of the adjustment process of determination standard to be performed by the degradation estimation apparatus 102 in this case. The process illustrated in FIG. 16 is performed every time the service record 112 describing the detail of regular inspection is obtained.

The process illustrated in FIG. 16 differs from the process illustrated in FIG. 9 in the detail of step S134A.

In other words, when it is determined that no service is performed at step S133 (No at S133), the determination standard adjustment portion 127 does not change the determination standard (S134A).

As described above, in a case where the critical degradation is found during the regular inspection, namely, in a case where the alarm 113 should have been sent out but was not, the degradation estimation system 100 according to the present embodiment makes an adjustment so as to send the alarm 113 at an earlier stage by setting the determination standard lower. In this way, the degradation estimation system 100 enables the automatic adjustment of the determination standard in such a way that the estimation of the degradation state is performed more appropriately.

Next, modification examples of the present embodiment are described.

Figure 17:
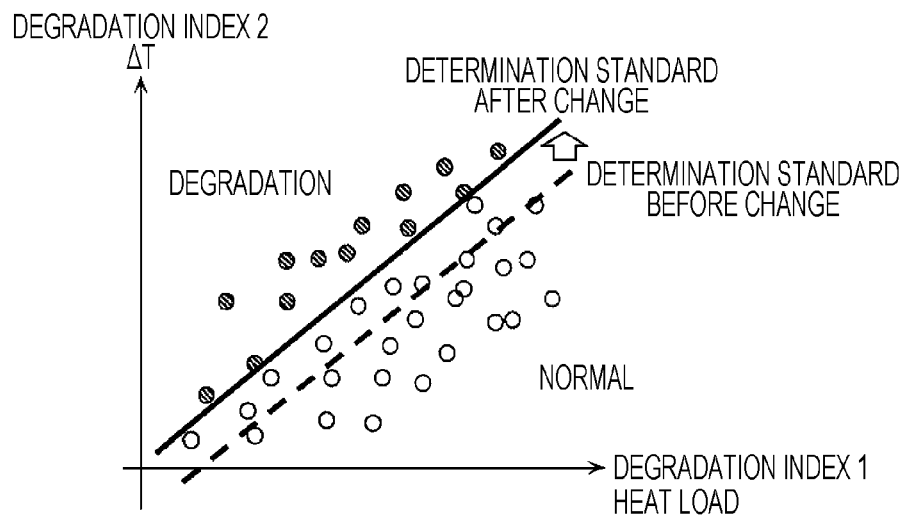
FIG. 17 is a diagram illustrating another example of determination standard according to an embodiment.

In the above description, as a way of the degradation estimation, the case is described where it is determined whether single degradation index meets a determination standard or not. Alternatively, two or more degradation indices may be used. For example, as illustrated in FIG. 17, in addition to the aforementioned $\Delta T$, a degradation index based on heat load may be used as well. For example, it is determined in which of two regions a point is located, where the point represents two degradation indices, and the two regions are separated by a linear function representing a determination standard. In this case, the raising the determination standard is to change the determination standard so as to reduce the degradation region, and the lowering the determination standard is to expand the degradation region. In FIG. 17, the determination standard is moved in parallel by the adjustment. Alternatively, in addition to or in place of such movement, an inclination of the determination standard may be changed.

Figure 18:
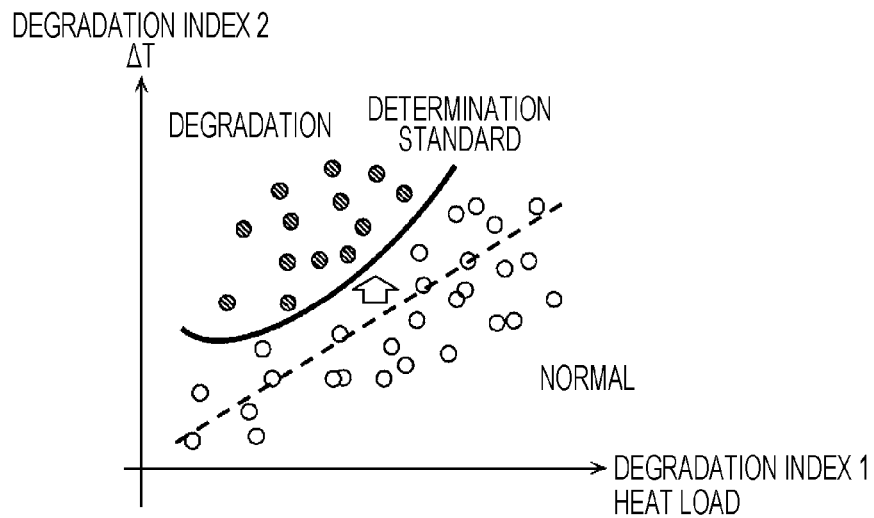
FIG. 18 is a diagram illustrating another example of determination standard according to an embodiment.

Further, as illustrated in FIG. 18, a non-linear determination standard may alternatively be used. For example, the regions for normal time and degradation time may be separated by a non-linear determination standard by use of clustering or machine learning (Bayes' estimation or Support Vector Machine (SVM)).

Figure 19:
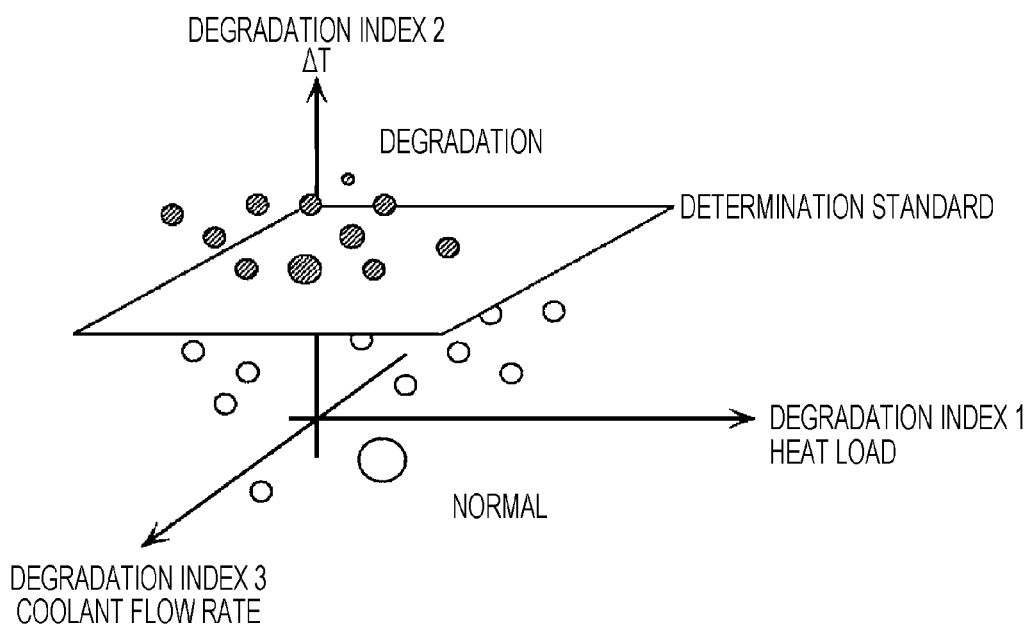
FIG. 19 is a diagram illustrating another example of determination standard according to an embodiment.

Further, as illustrated in FIG. 19, three degradation indices may be used. For example, as illustrated in FIG. 19, a degradation index based on coolant flow rate may be additionally used. For example, it is determined in which of two regions a point is located, where the point represents three degradation indices, and the two regions are separated by a plane representing a determination standard.

Figure 20:
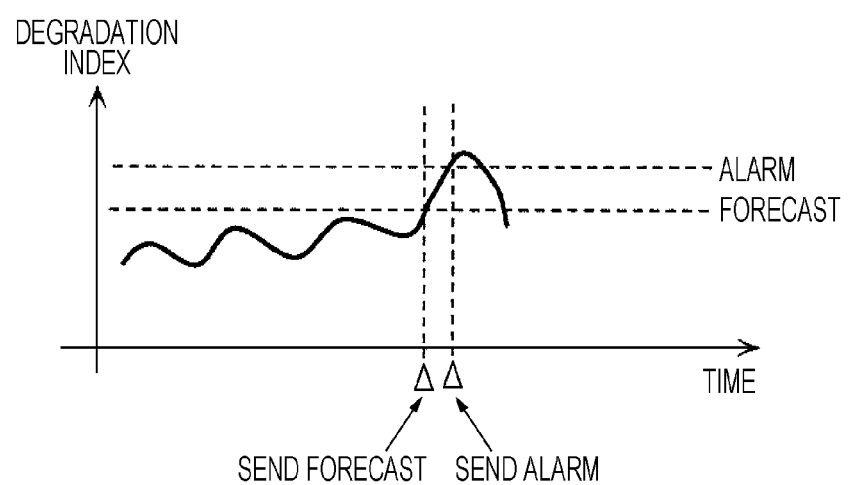
FIG. 20 is a diagram illustrating an example of operation in a case where two determination standards are used according to an embodiment.

Further, as illustrated in FIG. 20, alarms in a plurality of stages may be used. For example, a forecast is sent out when a degradation index exceeds a determination standard for forecast, and an alarm is sent out when the degradation index goes over the determination standard for forecast and exceeds a determination standard for alarm. In this case, the foregoing adjustment process may be independently performed on each of the determination standards for forecast and alarm, or alternatively, the foregoing adjustment process may be performed on only one of the determination standards for forecast and alarm, and in conjunction with this adjustment process, the other of the determination standards of forecast and alarm may be adjusted. For example, the degradation estimation apparatus 102 may perform the foregoing adjustment process on the determination standard for alarm, and when the determination standard for alarm is raised, the degradation estimation apparatus 102 may raise the determination standard for forecast in a similar manner, and when the determination standard for alarm is lowered, the degradation estimation apparatus 102 may lower the determination standard for forecast in a similar manner.

The non-form record 144 is not limited to the service log and the like, and may be voice data or image data. In that case, the voice data or the image data are converted to text data by voice recognition or image recognition. For example, voice data obtained from a voice recorder, a customer call, or the like may be assumed as the voice data. In this case, the voice data is converted to text data by voice recognition and is subjected to a keyword search as in the foregoing case.

The image data may be a photo indicating the state (degree of dirtiness) of the device 101, a photo capturing a sensor of the device 101, or a photo capturing a paper service log. With regard to the photo indicating the state (degree of dirtiness) of the device 101, the degradation estimation apparatus 102 compares this photo with a predetermined standard picture and determines that the dirtiness is severe (degradation) when their similarity is high.

Further, with regard to the photo capturing a sensor of the device 101, the degradation estimation apparatus 102 extracts a value or word in the sensor by image recognition and performs a keyword search on the extracted value or word as in the foregoing case. With regard to the photo capturing a paper service log, the degradation estimation apparatus 102 extracts words by image recognition and performs a keyword search on the extracted values or words as in the foregoing cases.

Figure 21:
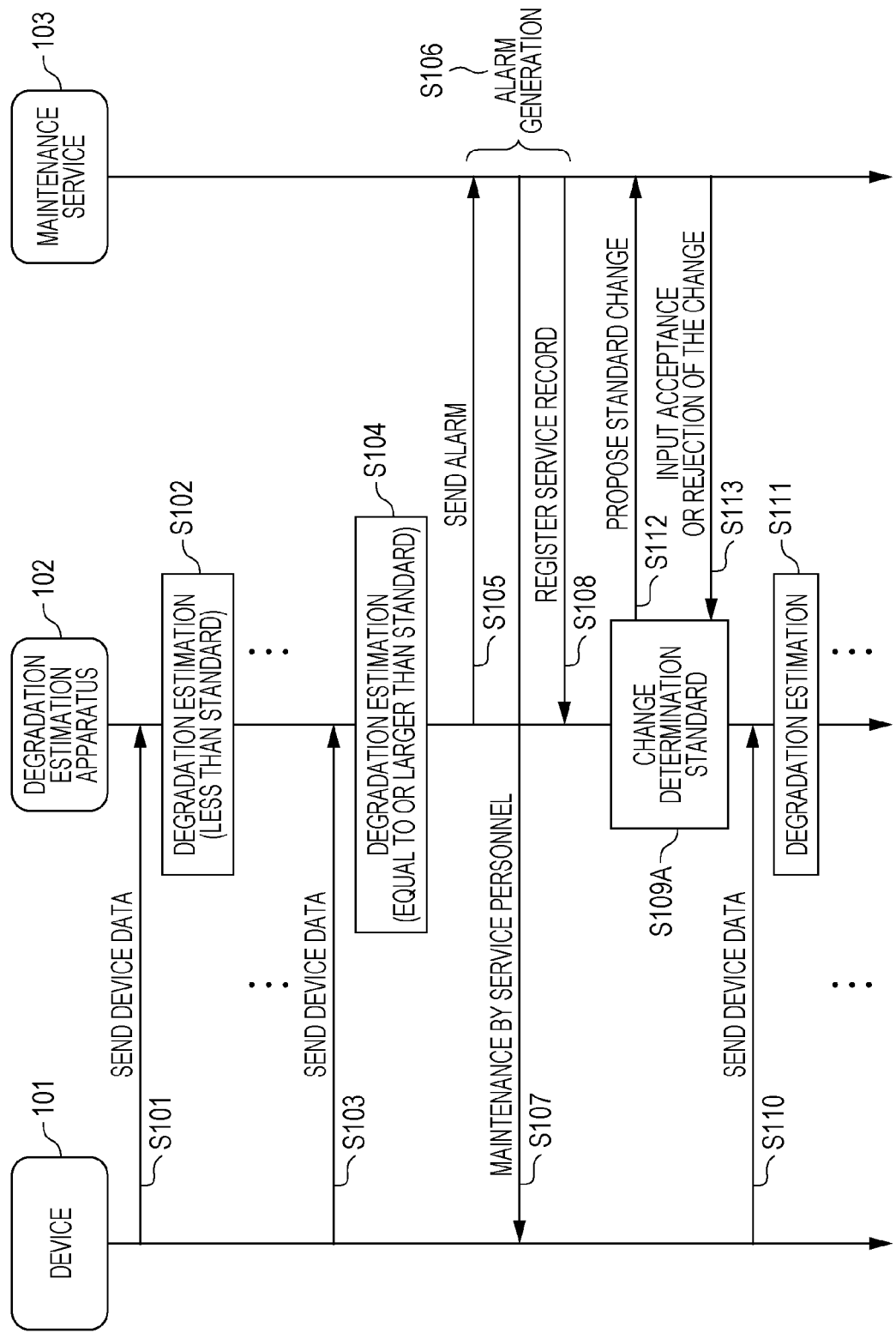
FIG. 21 is a diagram illustrating a modified example of operation at time of alarm notification according to an embodiment.

The change in determination standard by the degradation estimation system 100 is not only performed in an automatic fashion, and may alternatively be performed by proposing a change in determination standard to a user (service personnel) from the degradation estimation system 100 and effecting the change in determination standard only when the user (service personnel) grants an approval. FIG. 21 is a diagram illustrating an operation sequence in this case. A process illustrated in FIG. 21 differs from the process illustrated in FIG. 4 in that the step S109 is changed to step S109A and steps S111 and S112 are added.

Specifically, as illustrated in FIG. 21, in the change of determination standard (S109A), when it is determined that the determination standard 147 needs to be adjusted, the degradation estimation apparatus 102 sends an inquiry to a user as to whether the user approves such adjustment or not (S112). For example, based on a request from the degradation estimation apparatus 102, the maintenance service 103 sends an inquiry as to whether the user approves this adjustment or not. When the adjustment is approved by the user, the maintenance service 103 notifies the degradation estimation apparatus 102 of the user's approval (S113), and the degradation estimation apparatus 102 effects the adjustment of the determination standard 147.

The agent of the foregoing operation illustrated in FIG. 21 is merely an example, and the foregoing operation may be performed by either the degradation estimation apparatus 102 or the maintenance service 103.

Figure 22:
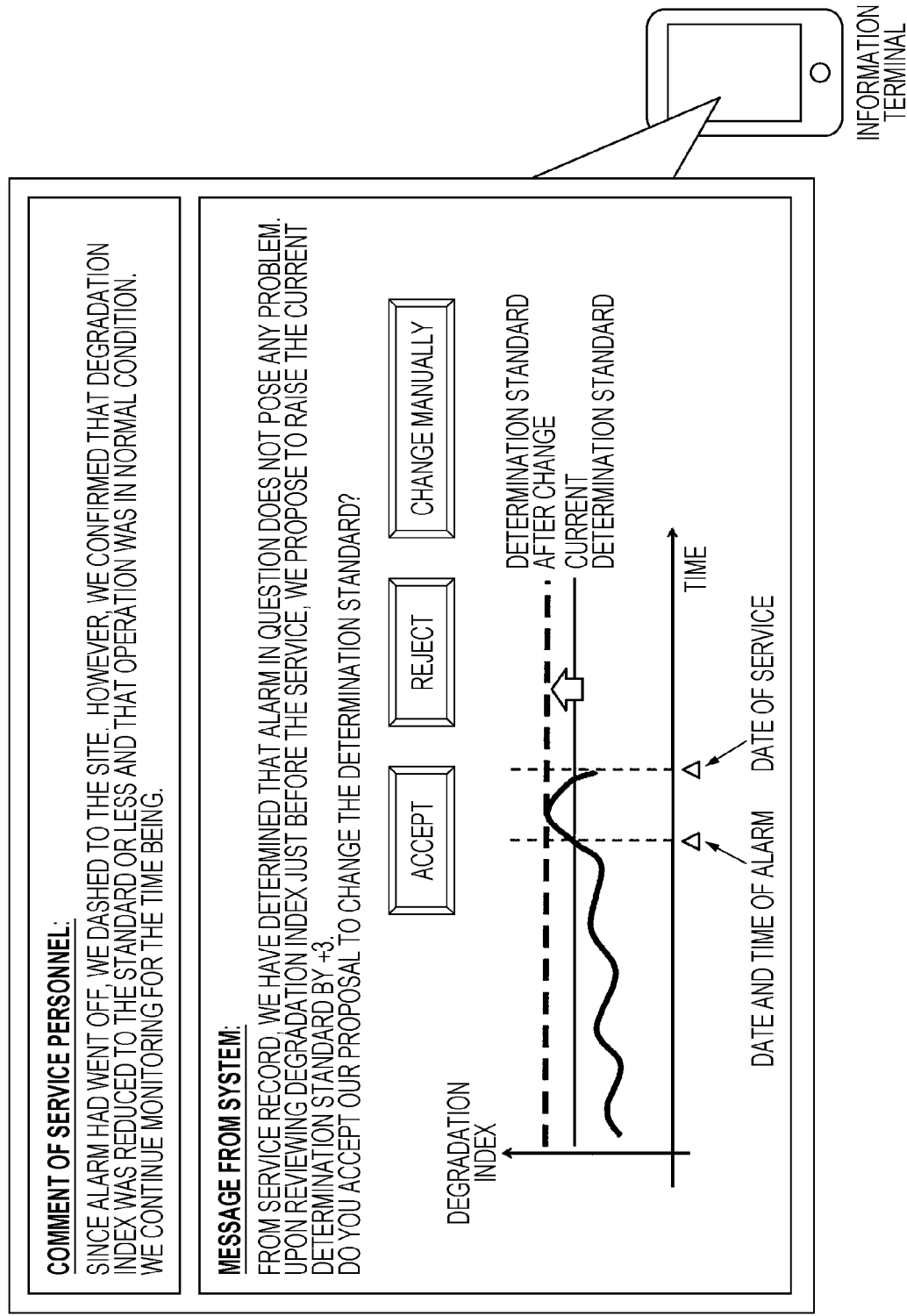
FIG. 22 is a diagram illustrating an example of display at time of proposal notification regarding a change in determination standard according to an embodiment.

FIG. 22 is a diagram illustrating an example of a display of an information terminal a user uses when a proposal to change the determination standard is sent to the user from the side of a system (S112) in response to the detail of service record registered in the system by the service personnel. In FIG. 22, the service personnel have registered in the system that "Since an alarm had went off, we dashed to the site. However, we confirmed that the degradation index was reduced to the standard or less and that the operation was in normal condition. We continue monitoring for the time being", and in response to this detail, it is determined whether there is any problem in the system side regarding the alarm, and a proposal is made to raise the determination standard of degradation.

Further, to facilitate user's intuitive understanding of a relationship between a progress of degradation and the determination standard, a progress of the degradation index until now and determination standards at present and after the change are illustrated in graph form and the like.

The user may inform the system as to whether the change of the determination standard is approved or not by pressing an "accept" button when the user approves the change proposed by the system and pressing a "reject" button when the user does not approve. Alternatively, the user may manually change the determination standard based on the progress of the degradation index displayed in the graph. In that case, the user informs the system of a value to be changed, not the approval or disapproval of the change in determination standard.

Alternatively, the user may be allowed to directly describe his or her intention to change the determination standard in the service record, thereby making it possible to change the determination standard of degradation.

Figures 23, 24:
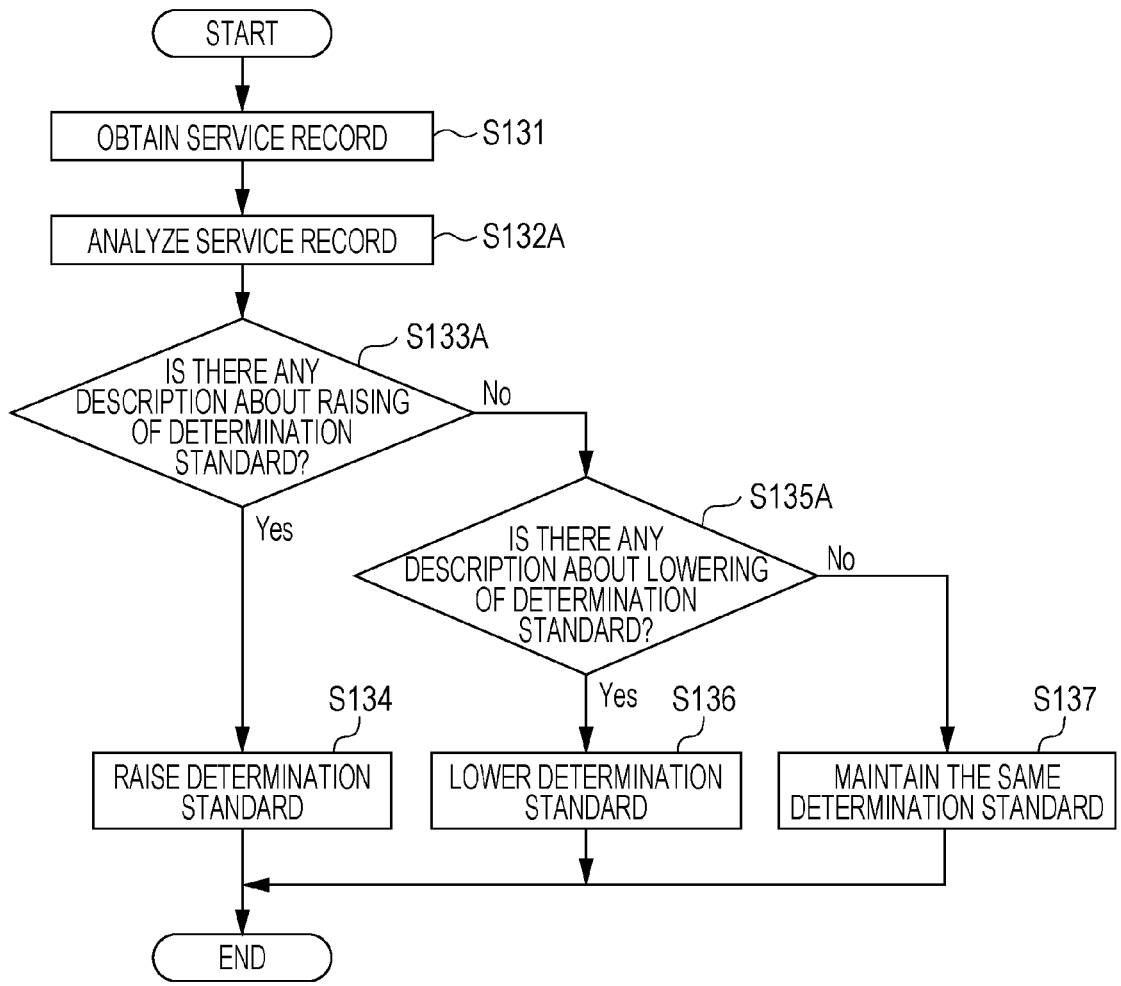
FIG. 23 is a diagram illustrating examples of keywords to be used in a modification example of determination standard adjustment process according to an embodiment.
FIG. 24 is a flowchart of a modification example of determination standard adjustment process according to an embodiment.

FIG. 23 is a diagram illustrating examples of keywords that determine the raising or lowering of the determination standard. For example, as illustrated in FIG. 23, when the service record includes a description such as "raise the determination standard by . . . " and like, it is determined that the determination standard 147 needs to be raised. Whereas, when the service record includes a description such as "lower the determination standard by . . . " and like, it is determined that the determination standard 147 needs to be lowered.

FIG. 24 is a flowchart of an adjustment process of the determination standard in this case. The process illustrated in FIG. 24 differs from the process illustrated in FIG. 9 in details of steps S132A, 134A and 134B.

First, the service record acquisition portion 124 obtains a service record 112 from the maintenance service 103 (S131). Next, by analyzing the service record 112 (the form record 143 or the non-form record 144), the analysis portion 126 determines whether a description suggesting an adjustment (change) of the determination standard is included in the service record 112 (S132A). Specifically, the analysis portion 126 determines whether the service record 112 includes a description suggesting raising the determination standard or not and whether the service record 112 includes a description suggesting lowering the determination standard or not.

The determination standard adjustment portion 127 adjusts the determination standard when the service record 112 includes a description suggesting an adjustment of the determination standard. Specifically, when a description suggesting raising of the determination standard in the service record 112 (Yes at step S133A), the determination standard adjustment portion 127 performs an adjustment to set the determination standard higher than the current determination standard (S134). When a description suggesting lowering of the determination standard in the service record 112 (Yes at step S135A), the determination standard adjustment portion 127 performs an adjustment to set the determination standard lower than the current determination standard (S136). When neither a description suggesting raising of the determination standard nor a description suggesting lowering of the determination standard is included in the service record 112 (No at S133A and No at step S135A), the determination standard adjustment portion 127 does not change the determination standard (S137).

In this way, based on the service record 112, the degradation estimation system 100 enables automatic adjustment of the determination standard in such a way that the estimation of the degradation state is performed more appropriately.

Although the degradation estimation apparatuses and the degradation estimation systems according to some embodiments of the present disclosure have been described above, the present disclosure is not limited to these embodiments.

For example, in the foregoing description, both the adjustment process of the determination standard and the degradation estimation process using the determination standard are performed at the degradation estimation apparatus 102. Alternatively, these processes may be respectively performed at separate apparatuses.

In the foregoing description, the examples are described where both the form record and the non-form record are used as the service record. Alternatively, only one of these two may be used.

The present disclosure may be implemented as a degradation estimation method including a plurality of steps performed by the foregoing degradation estimation apparatus. For example, this degradation estimation method may be implemented by a computer including a processor and a memory.

Typically, each processing portion included in the degradation estimation apparatus according to the foregoing embodiment is implemented by an individual device or software of a server connected to a network. In some case, all or part of the processing portions may be implemented as one or more LSIs or one or more integrated circuits inside the apparatus. The processing portions may be separately formed in a single chip form or may be formed as a single chip so as to include part or all of the processing portions.

Formation of integrated circuit is not limited to a form of LSI, and may be achieved with a dedicated circuit or a general-purpose processor. Alternatively, a field programmable gate array (FPGA) or a reconfigurable processor may be used. The FPGA can be programmed after the manufacturing of LSI, and the reconfigurable processor is a processor whose circuit cell connections inside LSI or setup can be reconfigured.

In other words, in each of the foregoing embodiments, each constituting elements may be constituted with dedicated hardware or may be implemented by executing a software program suited for this constituting element. Each constituting element may alternatively be implemented by causing a program executing unit such as a CPU, a processor, or the like to read a software program stored in a storage medium such as a hard disk or a semiconductor memory and execute the software program.

The division of functional blocks illustrated in the block diagram is merely one example. A plurality of functional blocks may be implemented as single functional block, or single functional block may be divided into a plurality of functional blocks, or part of function in one functional block may be transferred to another functional block. Functions of a plurality of functional blocks having similar functions may be processed in parallel or in time series manner by a single piece of hardware or software.

The sequences with which a plurality of steps illustrated in the foregoing flowcharts is executed is only examples for specifically describing the present disclosure, and different sequences other than the above may alternatively be used. Part of the foregoing step may be executed with another step simultaneously (parallel).

The present disclosure may be implemented as a degradation estimation method that is executed by the foregoing degradation estimation apparatus or the foregoing degradation estimation system.

Although the degradation estimation apparatuses according to one or more aspects have been described above based on the embodiments, the present disclosure is not limited to these embodiments.

Embodiments obtained by applying various modifications apparent to those skilled in the art to the present embodiments and embodiments formed by combining constituting elements of different embodiments may be included in the scope of the one or more aspects provided that they do not depart from the scope of the present disclosure.

The present disclosure may be applicable to degradation estimation apparatuses and degradation estimation systems. For example, the present disclosure may be applicable to a system that manages devices such as a large size air conditioners and the like.

What is claimed is:

1. A degradation estimation method comprising:
   determining, by a processor, a first determination standard when estimating whether there is a degradation of a device or not;
   sending a first alarm, when estimating that there is a degradation using the first determination standard;
   acquiring, by the processor, a service record of maintenance of a device, the service record being a record of work performed for the maintenance of the device indicating the maintenance of the device performed in response to the first alarm;
   analyzing, by the processor, a degradation state of the device based on the service record for determining a presence or absence of degradation of the device;
   adjusting, by the processor, the first determination standard to a second determination standard when the absence of degradation of the device is determined;
   receiving, by the processor, first device data from a sensor installed in the device, the first device data indicating a state of the device;
   estimating, by the processor, whether there is degradation of the device or not using the first device data acquired and the second determination standard; and
   sending a second alarm, when estimating that there is a degradation using the received first device data and the second determination standard.

2. The degradation estimation method according to claim 1, wherein
   the service record is a service record in a free style format.

3. The degradation estimation method according to claim 1, wherein
in the analyzing, the processor determines, from the service record, whether the degradation of the device advances further than a standard or not, and
in the adjusting, when the degradation of the device is determined to have advanced further than the standard, the second determination standard is set lower than the first determination standard.

4. The degradation estimation method according to claim 3, wherein
in the estimating, the device is estimated as having degradation when a first degradation index is greater than the second determination standard, the first degradation index being calculated based on the first device data, and
in the adjusting, when the degradation of the device is determined to have advanced further than the standard, the second determination standard is set between the first determination standard and a second degradation index, the second degradation index being calculated from second device data indicating a state of the device after the maintenance is performed.

5. The degradation estimation method according to claim 1, wherein
in the adjusting, when the processor determines that there is no degradation of the device, the second determination standard is set higher than the first determination standard.

6. The degradation estimation method according to claim 1, wherein
in the estimating, the device is estimated as having degradation when a first degradation index is greater than the second determination standard, the first degradation index being calculated based on the first device data, and
in the adjusting, when the processor estimates that no service is performed, the second determination standard is set higher than a maximum value of a third degradation index, the maximum value of the third degradation index being calculated from third device data indicating a state of the device in a predetermined period up to time the maintenance is performed.

7. The degradation estimation method according to claim 1, further comprising:
acquiring, by the processor, fourth device data indicating a state of the device before the state indicated by the first device data;
estimating, by the processor, whether there is degradation of the device or not using the fourth device data acquired and the first determination standard; and
sending, by the processor, an alarm when the processor estimates that there is degradation of the device in the estimating, wherein
the acquiring, the estimating, and the sending are performed before the acquiring of the service record, and
the maintenance is a maintenance of the device performed in response to the alarm sent.

8. The degradation estimation method according to claim 1, wherein
the maintenance is a maintenance performed regularly.

9. The degradation estimation method according to claim 1, wherein
determination standards are generated for each customer to which a plurality of devices belongs, the plurality of devices including the device, the determination standards being different from each other.

10. The degradation estimation method according to claim 1, wherein
in the adjusting,
when the processor determines that the first determination standard is to be adjusted to the second determination standard, an inquiry is sent to a user to ask whether the user approves this adjustment or not, and
when the user approves the adjustment, the first determination standard is adjusted to the second determination standard.

11. The degradation estimation method according to claim 1, wherein
in the analyzing, the processor determines whether the service record includes a description suggesting an adjustment of the first determination standard or not,
in the adjusting, when the service record includes a description suggesting an adjustment of the first determination standard, the first determination standard is adjusted to the second determination standard.

12. The degradation estimation method according to claim 1, wherein
the adjusting of the first determination standard includes modifying of a degradation index.

13. The degradation estimation method according to claim 1, wherein
the presence or absence of the degradation of the device is determined in response to the work performed for the maintenance of the device.

14. The degradation estimation method according to claim 1, wherein
the adjusting is performed in response to the work performed for the maintenance of the device.

15. A degradation estimation apparatus comprising:
a processor configured to:
determine a first determination standard when estimating whether there is degradation of a device or not;
send a first alarm, when estimating that there is a degradation using the first determination standard;
acquire, via a network, a service record of maintenance of the device indicating the maintenance of the device performed in response to the first alarm, the service record being a record of work performed for the maintenance of the device;
analyze a degradation state of the device based on the service record to determine a presence or absence of degradation of the device;
adjust a first determination standard to a second determination standard when the absence of degradation of the device is determined;
receive device data from a sensor installed in the device, the device data indicating a state of the device;
estimate whether there is degradation of the device or not using the device data acquired and the second determination standard; and
send a second alarm, when estimating that there is a degradation using the received device data and the second determination standard.

* * * * *